United States Patent [19]

Naito

[11] Patent Number: 5,864,442
[45] Date of Patent: Jan. 26, 1999

[54] REPRODUCING APPARATUS CAPABLE OF CONTROLLING EQUALIZATION CHARACTERISTICS

[75] Inventor: Tatsuya Naito, Tokyo, Japan

[73] Assignee: Canon Kabushiki Kaisha, Tokyo, Japan

[21] Appl. No.: 654,577

[22] Filed: May 29, 1996

[30] Foreign Application Priority Data

May 29, 1995 [JP] Japan ................... 7-130601
May 29, 1995 [JP] Japan ................... 7-130620

[51] Int. Cl.$^6$ .................................................. G11B 5/035
[52] U.S. Cl. .................................................. 360/65
[58] Field of Search ................... 360/65, 69, 46, 360/25, 132

[56] References Cited

U.S. PATENT DOCUMENTS 4,338,644  7/1982  Staar ................... 360/69 X
4,422,108  12/1983  Sampei et al. ................... 36/65
4,841,385  6/1989  Nakano ................... 360/46 X
5,587,848  12/1996  Shimotashiro et al. ................... 360/46

OTHER PUBLICATIONS

"All pass for universal sc filters" by Al–Hashimi, B. Electronics World & Wireless World Vol. 99, pp. 511–514, Jun. 1993.

*Primary Examiner*—Alan Faber
*Attorney, Agent, or Firm*—Fitzpatrick, Cella, Harper & Scinto

[57] ABSTRACT

A digital data reproducer, such as a VCR, reproduces digital data from a plurality of types of recording media. An equalizer includes a plurality of all-pass filters, for equalizing the reproduced digital data. A controller controls the equalization characteristics of the equalizer in accordance with the type of recording media, and controls the group delay characteristics of at least one of the plurality of all-pass filters. Thus, a single equalizer may be used for the plurality of types of recording media.

22 Claims, 15 Drawing Sheets

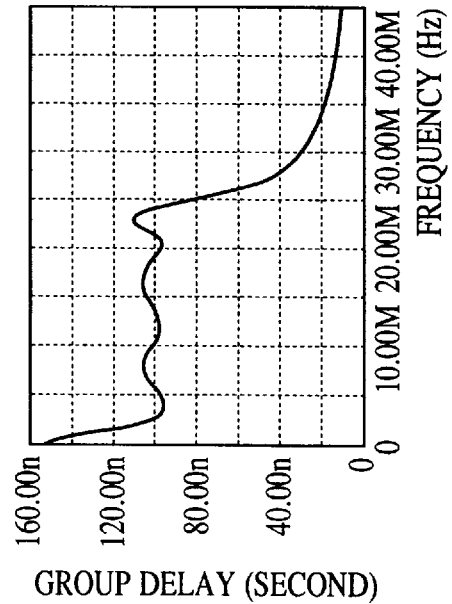
FIG. 4A2
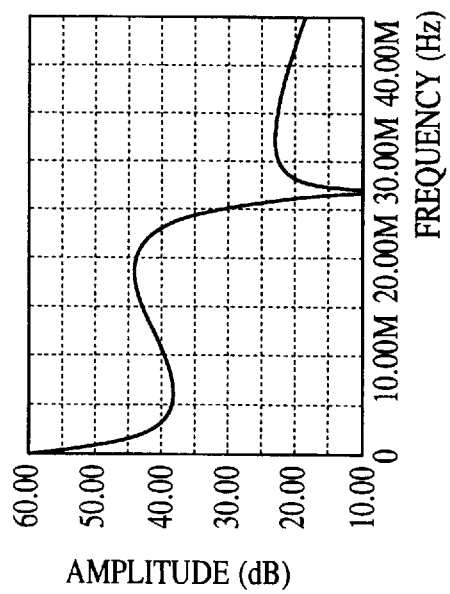
FIG. 4B2
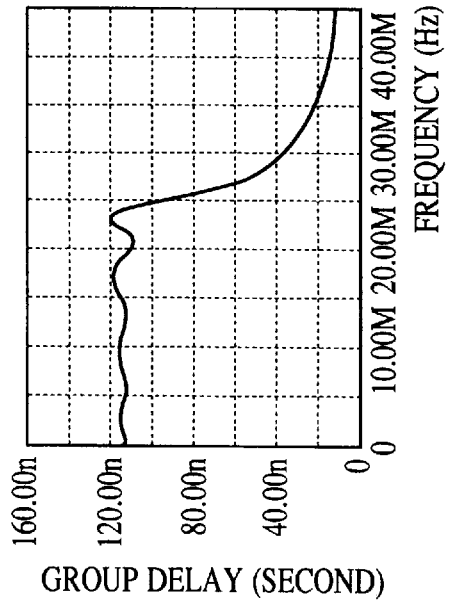
FIG. 4A1
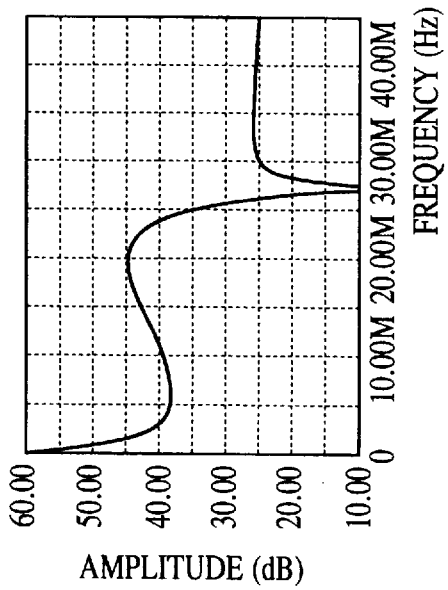
FIG. 4B1

REPRODUCING APPARATUS CAPABLE OF CONTROLLING EQUALIZATION CHARACTERISTICS

BACKGROUND OF THE INVENTION

1. Field of the Invention

The present invention relates to a reproducing apparatus, and more particularly, to an apparatus for reproducing digital data from different types of recording media.

2. Description of the Related Art

There is conventionally known an apparatus for reproducing digital data from different types of recording media, such as a digital VCR for recording data on magnetic tape by compressing the amount of the information of a digital video signal.

In such a digital VCR, high-density recording is demanded due to the large amount of recording-information. The head and tape of the VCR are suitably designed for such high-density recording.

Many media having magnetic anisotropy in the longitudinal direction, such as a metal-particle tape (hereinafter called MP tape), have been used in a digital VCR. Due to demagnetization in recording, there is a limit to increasing the density of the MP tape.

In contrast, a metal-evaporated tape (hereinafter called ME tape) has a small amount of demagnetization since it has magnetic anisotropy at a constant angle perpendicularly, providing superior high-density recording. In terms of reliability and costs, however, the MP tape is superior.

As described above, since these two types of tape have advantages and disadvantages respectively, it is best to use them based on the anticipated recording density.

In addition to the above-described features of the MP tape and the ME tape, they have different waveform responses in reproduction according to the differences in magnetic anisotropy. FIGS. 1A and 1B show the respective reproduction waveform response.

As shown in FIG. 1A, the MP tape generates a single-peak, symmetrical waveform, and as shown in FIG. 1B the ME tape produces a dipulse waveform including an undershoot at the trailing edge in the reproduction waveform.

In the above-described digital VCR, waveform equalizing processing is applied to a reproduction signal to detect the reproduction data. The equalization characteristics used in the equalizing processing are designed according to the reproduction waveform.

Since the waveform of the reproduction signal in the MP tape differs from that of a reproduction signal in the ME tape, an equalizer circuit having single equalization characteristics cannot appropriately equalize signals reproduced from both types of tape.

Therefore, the type of tape which can be used is automatically determined in the above-described digital VCR. Different types of tape cannot be used according to different recording densities, restricting flexibility.

SUMMARY OF THE INVENTION

Accordingly, it is an object of the present invention to solve the foregoing problems.

Another object is to obtain the most appropriate equalization characteristics with a simple circuit configuration.

The foregoing objects are achieved according to one aspect of the present invention through the provision of a reproducing apparatus having: reproducing means for reproducing digital data from a plurality of types of recording media; equalizing means for equalizing the digital data reproduced by the reproducing means, the equalizing means including a plurality of all-pass filters; and controlling means for controlling the equalization characteristics of the equalizing means according to the type of the recording media, wherein the controlling means controls the group-delay characteristics of at least one of the plurality of all-pass filters.

Still anther object of the present invention is to implement the most appropriate equalization characteristics according to the type of recording media.

The foregoing object is achieved according to another aspect of the present invention through the provision of a reproducing apparatus having: reproducing means for reproducing digital data from a plurality of types of recording media; integrating means for integrating the digital data reproduced by the reproducing means; detecting means for detecting the type of the recording media; and adding means for adding the digital data reproduced by the reproducing means to the output of the integrating means according to the output of the detecting means.

The other objects and the other features of the present invention will be understood from detailed description below for embodiments of the present invention taken in conjunction with the drawings.

BRIEF DESCRIPTION OF THE DRAWINGS

FIGS. 4A1, 4A2, 4B1 and 4B2 are graphs illustrating the operation of the circuit shown in FIG. 3.

DETAILED DESCRIPTION OF THE PREFERRED EMBODIMENTS

Embodiments of the present invention are described below with reference to the drawings.

Figure 2:
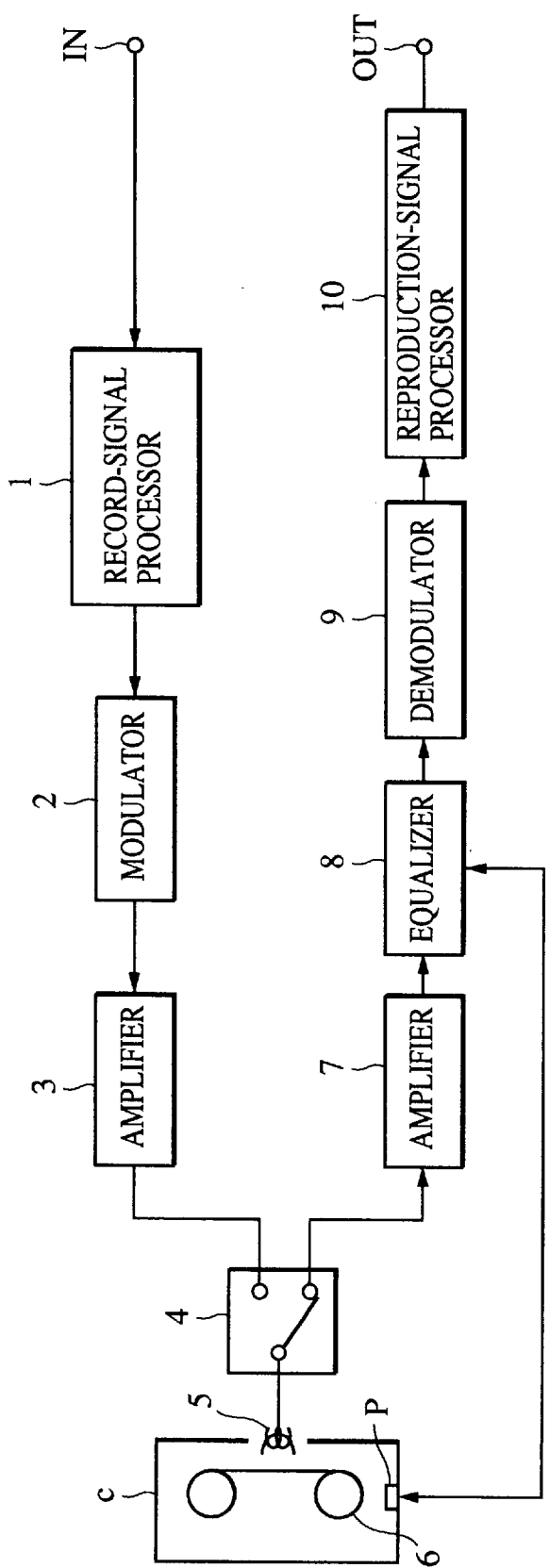
FIG. 2 is a block diagram showing a configuration of a digital VCR according to an embodiment of the present invention.

FIG. 2 is a block diagram showing a configuration of the main sections of a digital VCR according to an embodiment of the present invention. A digital video signal input from terminal IN is divided into blocks having a specified number of pixels in a record-signal processor 1, and the amount of information in the input signal is compressed by a technique such as discrete cosine transformation (DCT) and quantization, and is output to a modulator 2. The modulator 2 converts the compressed digital video-signal to a signal of the type suited for recording, and outputs the modulated video signal to an amplifier 3. The amplifier 3 amplifies the modulated video signal, and outputs the amplified signal to a head 5 of a cassette C through a switch 4. The head 5 records the video signal on tape 6.

In reproduction, the video signal reproduced by the head 5 from the tape 6 is amplified by an amplifier 7 which outputs the amplified signal to an equalizer 8. The equalizer 8 compensates for fluctuations in the amplitude and group delay of the reproduction signal in the electromagnetic conversion system as well as for the difference in the waveform of the reproduction signal, caused by the type of tape used, as will be described below, and outputs an equalized signal to a demodulator 9. The demodulator 9 demodulates the reproduction signal to which equalization processing has been applied, and detects the original digital data, converts it to a signal having 0's and 1's, and outputs the demodulated signal to a reproduction-signal processor 10. The reproduction-signal processor 10 applies a processing reverse to that in recording of the input original digital signal, converts the demodulated signal to the original digital video signal, and outputs a reproduction signal at a terminal OUT.

Figure 3:
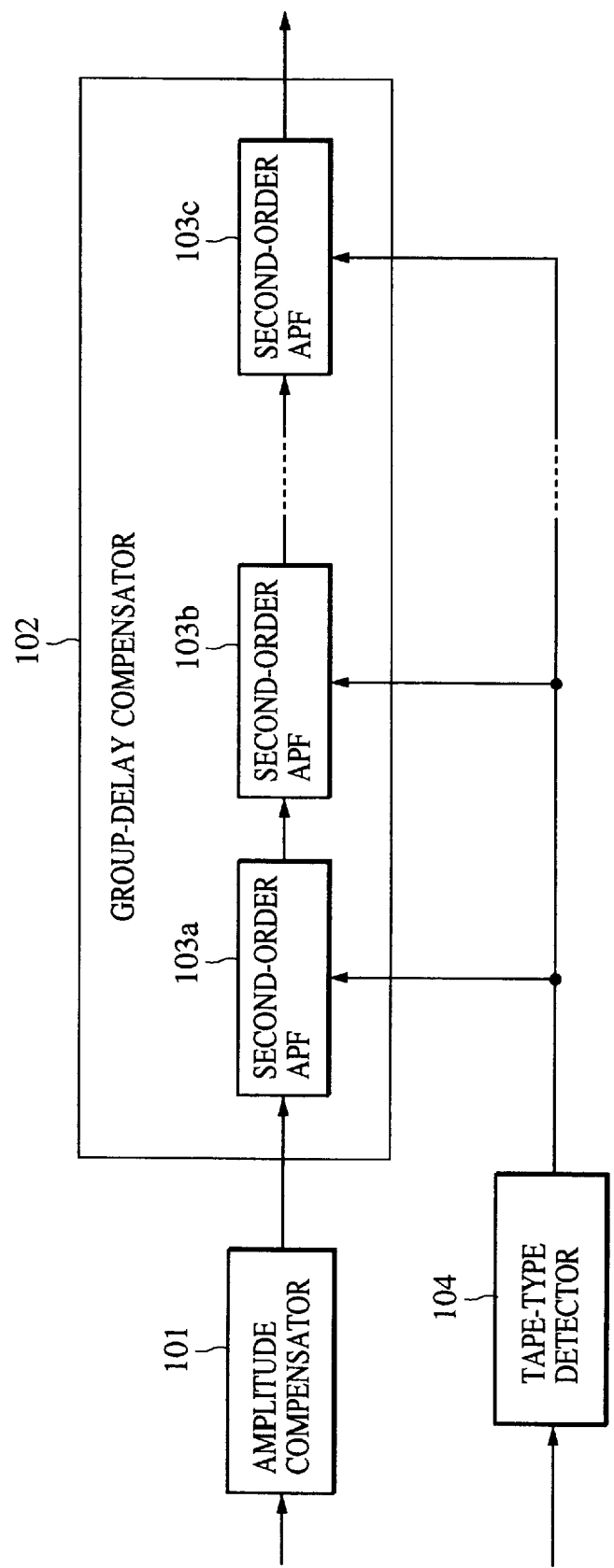
FIG. 3 is a block diagram illustrating a configuration of the equalizer 8 shown in FIG. 2.

FIG. 3 is a block diagram illustrating a configuration of the equalizer 8 of FIG. 2. The equalizer 8 includes an amplitude compensator 101, a group-delay compensator 102 and a tape-type detector 104. The tape-type detector 104 detects the resistance of terminal P provided for cassette C (FIG. 2) to detect the type of tape. According to the detection result, the group-delay characteristics of a plurality of all-pass filters composing the group-delay compensator 102 are switched to implement the most appropriate equalization characteristics.

Figure 1A:
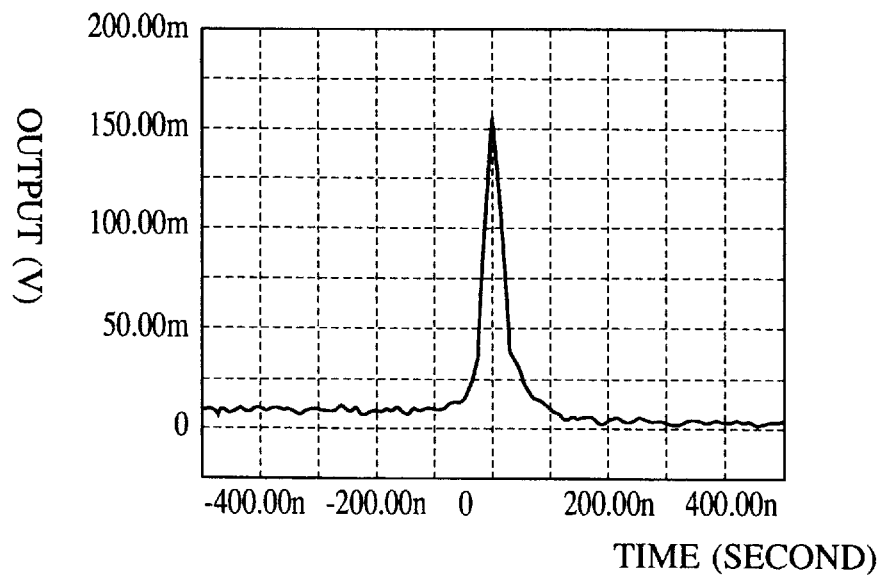
FIGS. 1A and 1B are graphs showing waveform responses in MP-tape and ME-tape reproduction, respectively.
Figure 1B:
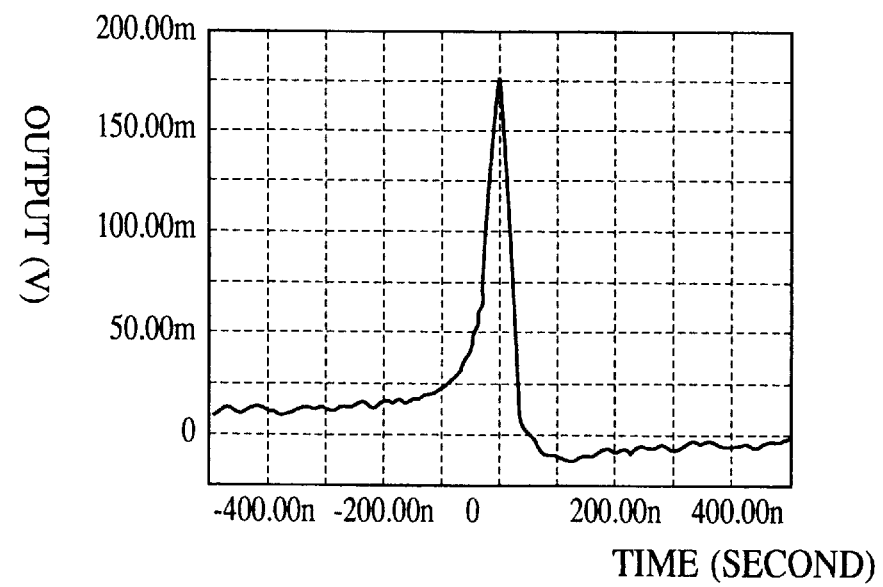

Assuming that the relative speed between the head and the tape is 10.2 m/s and the record wavelength is 0.49 $\mu$m, the waveform responses of the ME tape and the MP tape shown in FIGS. 1A and 1B, respectively, are obtained.

Waveform analysis is performed to the responses and the most appropriate amplitude characteristics for MP tape (FIG. 4A1) and ME tape (FIG. 4B1) and group-delay characteristics for MP tape (FIG. 4A2) and ME tape (FIG. 4B2) of the equalizer circuit for each of the waveform responses are obtained. As is clearly seen from FIGS. 4A1 and 4B1, the similar target amplitude characteristics are obtained for both types of the tape, but as is seen from FIGS. 4A2 and 4B2 the target group-delay characteristics are different, especially for low frequency components for both types of the tape.

Figure 5:
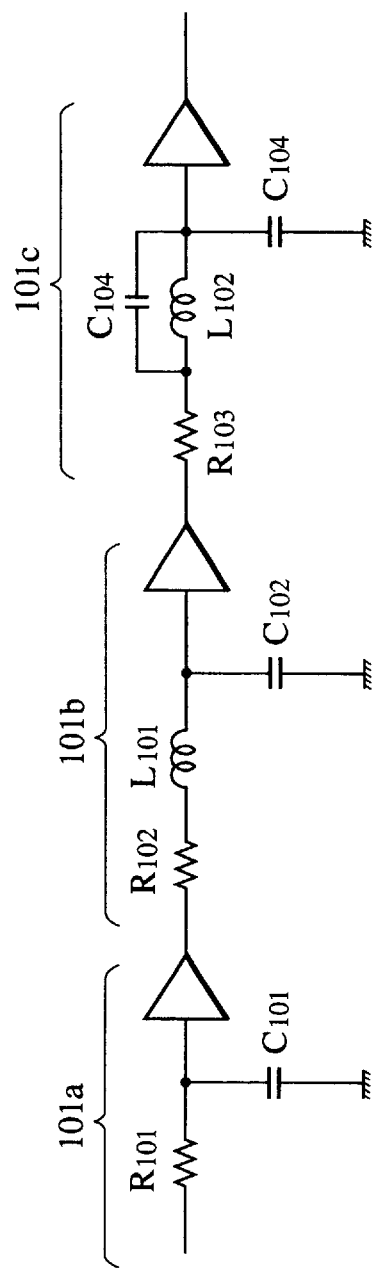
FIG. 5 is a detailed configuration of the amplitude compensator 101 shown generally in FIG. 3.
Figure 6:
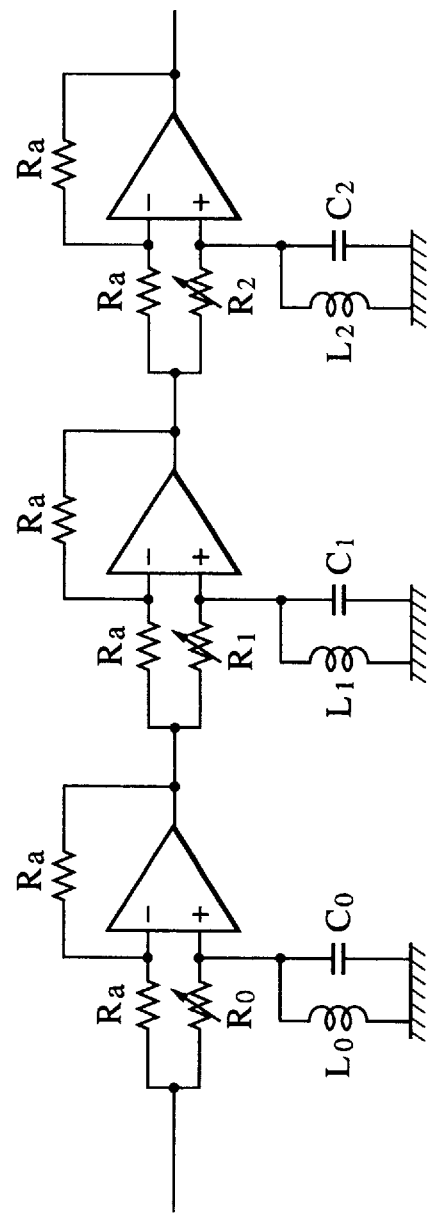
FIG. 6 is a detailed circuit configuration of the group-delay compensator 102 shown generally in FIG. 3.
Figure 7:
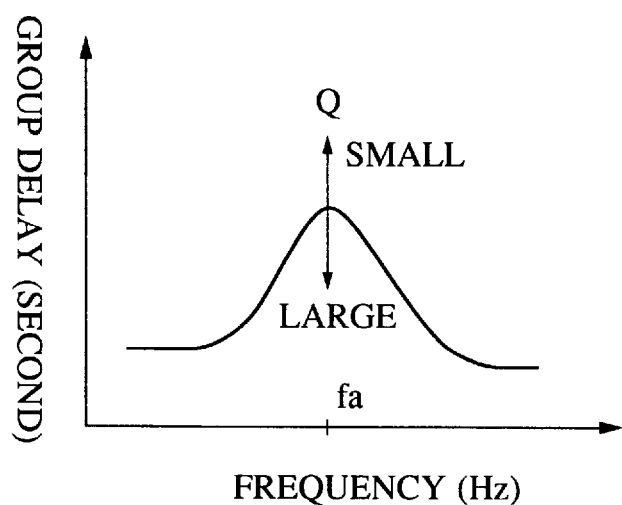
FIG. 7 is a graph illustrating the group-delay characteristics of the second-order all-pass filters 103a–103c shown in FIG. 6.

FIG. 5 is a detailed circuit configuration of the amplitude compensator 101 (FIG. 3) for implementing these characteristics in this embodiment. As described in the present embodiment, a signal reproduced through the magnetic recording-reproducing system has differential characteristics and characteristics of loss of its high-frequency components. The amplitude compensator 101 compensates for the distortion in the amplitude of a reproduced signal, which are mainly caused by the two types of said characteristics, and includes the following three circuits. The first circuit is a integral circuit 101a having $R_1$, and $C_{101}$ for compensating for the above-described differential characteristics. The second circuit is a high-frequency emphasis circuit 101b having $R_{102}$, $L_{101}$ and $C_{102}$ for emphasizing the amplitude of the reproduced signal at high frequencies (around 20 MHz). The third circuit is a filter having $R_{103}$, $C_{103}$, $L_{102}$, and $C_{104}$ for cutting off extra high-frequency components (those having a frequency of 27 MHz or more). FIG. 6 is a detailed circuit configuration of the group-delay compensator 102. As shown in FIG. 6, the group-delay compensator 102 uses three active, second-order, all-pass filters having the group-delay characteristics shown in FIG. 7.

The group-delay characteristics of a second-order, all-pass filter can be expressed as follows;

$$t(f)=(f^2-fa/Q \times f + fa^2)/(f^2+fa/Q \times f + fa^2)$$

where Q stands for a quality factor and fa is the resonant frequency. With Q and Fa being changed to adjust the magnitude of the group delay and the peak frequency, the desired group-delay characteristics can be obtained.

In the active, all-pass filters shown in FIG. 6, for example, fa and Q can be expressed as follows;

$$fa=(1/LC) \times (1/2\pi)$$

fa can be changed by controlling the capacitance of capacitors C ($C_0$ to $C_2$) and the inductance of inductors L ($L_0$ to $L_2$).

$$Q=(fa/2\pi)CR$$

Q can be changed by altering the resistance of variable resistors R ($R_0$ to $R_2$).

In this embodiment, fa is fixed in the three, all-pass filters and Q is controlled to changed the group-delay characteristics.

Let Q and fa of each of the three all-pass filters be called Q0, $f_0$, $Q_1$, $f_1$, $Q_2$, and $f_2$, and let $f_0$ be set to 7 MHz, $f_1$ to 11 MHz, and $f_2$ to 19 MHz. The group-delay target characteristics shown in FIGS. 4A2 and 4B2 are obtained with $Q_0$ being set to 1.8, $Q_1$ to 1.0 and $Q_2$ to 0.7 for the MP tape and with $Q_0$ being set to 3.3, $Q_1$ to 1.1 and $Q_2$ to 1.0 for the ME tape.

In the present embodiment, interleaved NRZI processing is applied by the modulator 2 (FIG. 2) for recording. Therefore, in reproduction, the equalizer 8 performs integral equalization processing and the demodulator 10 applies reverse I-NRZI processing, which is the reverse of the interleaved NRZI processing, for the reproduction signal. Such processing has recently been used as a recording and reproduction technique using a partial response (PR (1, 0, –1) in this embodiment). Intercode interference is produced in recording and this intercode interference is removed in reproduction, thereby suppressing the influence of intercode interference in high-density recording.

Figure 8:
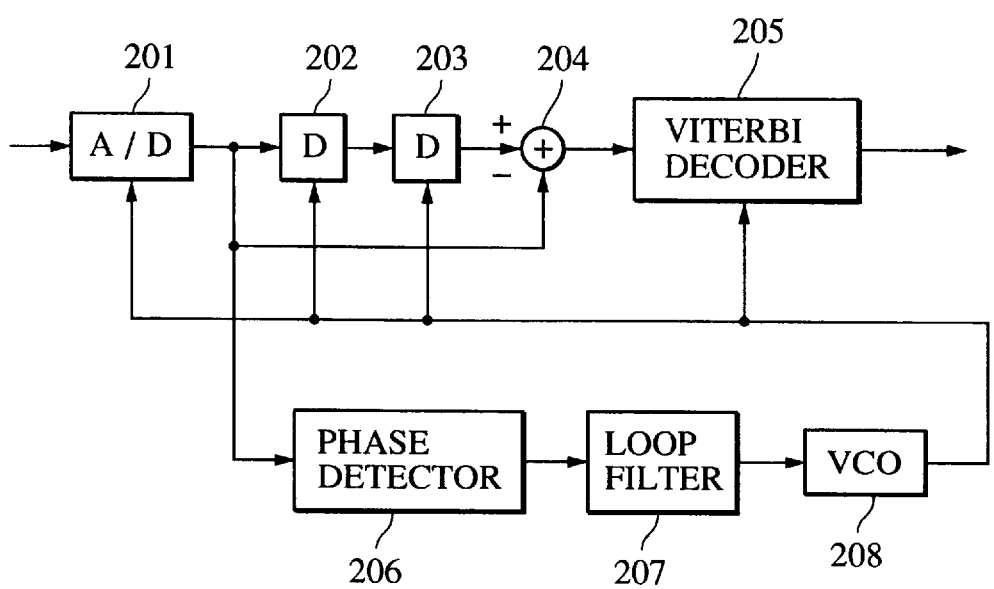
FIG. 8 is a detailed block diagram of the demodulator 9 shown in FIG. 2.

Further, in this embodiment, digital data having 0's and 1's is detected from data to which reverse I-NRZI processing is applied, using Viterbi decoding. FIG. 8 shows a configuration of a demodulator 10 using such detection.

In FIG. 8, the reproduction signal equalized as described above is serially input to an A/D converter 201 bit by bit, and is converted to a digital signal having, for example, six bits. The signal output from the A/D converter 201 is delayed by delay circuits 202 and 203 each having a delay time corresponding to a one-bit clock, and the delayed signal is output to a subtracter 204. The signal output from the A/D converter 201 is also provided to the subtracter 204 and a phase detection circuit 206.

The delay circuits 202 and 203 and the subtracter 204 perform reverse I-NRZI processing, which is expressed by $1-D^2$.

A Viterbi decoder 205 produces a signal having 0's and 1's from reproduction data using the known Viterbi decoding method and outputs the decoded signal to the reproduction-signal processor 10 (FIG. 2).

The phase detector 206 detects the phase of the signal output from the A/D converter 201 to detect the phase difference between the reproduction signal and the clock output from a VCO 208, and outputs the phase difference signal to the VCO 208 through a loop filter 207. The VCO 208 outputs an operation clock having a frequency determined according to the voltage of the signal output from the loop filter 207, to the Viterbi decoder 205 and the A/D converter 201. A phase locked loop (PLL) includes the phase detector 206, the loop filter 207, and the VCO 208 to provide the clock signal synchronized in phase with the reproduction signal.

As described above, in this embodiment, the group-delay characteristics of the equalizer 8 can be switched by specifying the size of the corresponding capacitors C and inductors L according to fa of each of the three all-pass filters, and by varying resistors R according to the detection result of the tape-type detector 104 in reproduction to change Q of each of the three all-pass filters.

Therefore, the most appropriate equalization characteristics for both MP and ME tape can be obtained by one equalizer circuit. In addition, since the group-delay compensator 102 comprises second-order all-pass filters in this embodiment, the appropriate equalization characteristics for each type of tape can be achieved with a simple configuration. Consequently, data can be detected correctly from the reproduction signal.

In the above-described embodiment, the group-delay characteristics of each of the three all-pass filters are switched. Since the MP tape and the ME tape have a large difference in the target characteristics of the group-delay compensator 102 especially in the low frequency components as described above, the group-delay characteristics of at least one of a plurality of the all-pass filters, particularly a filter which compensates for the group-delay characteristics in the low frequency components, may be changed.

Figure 9:
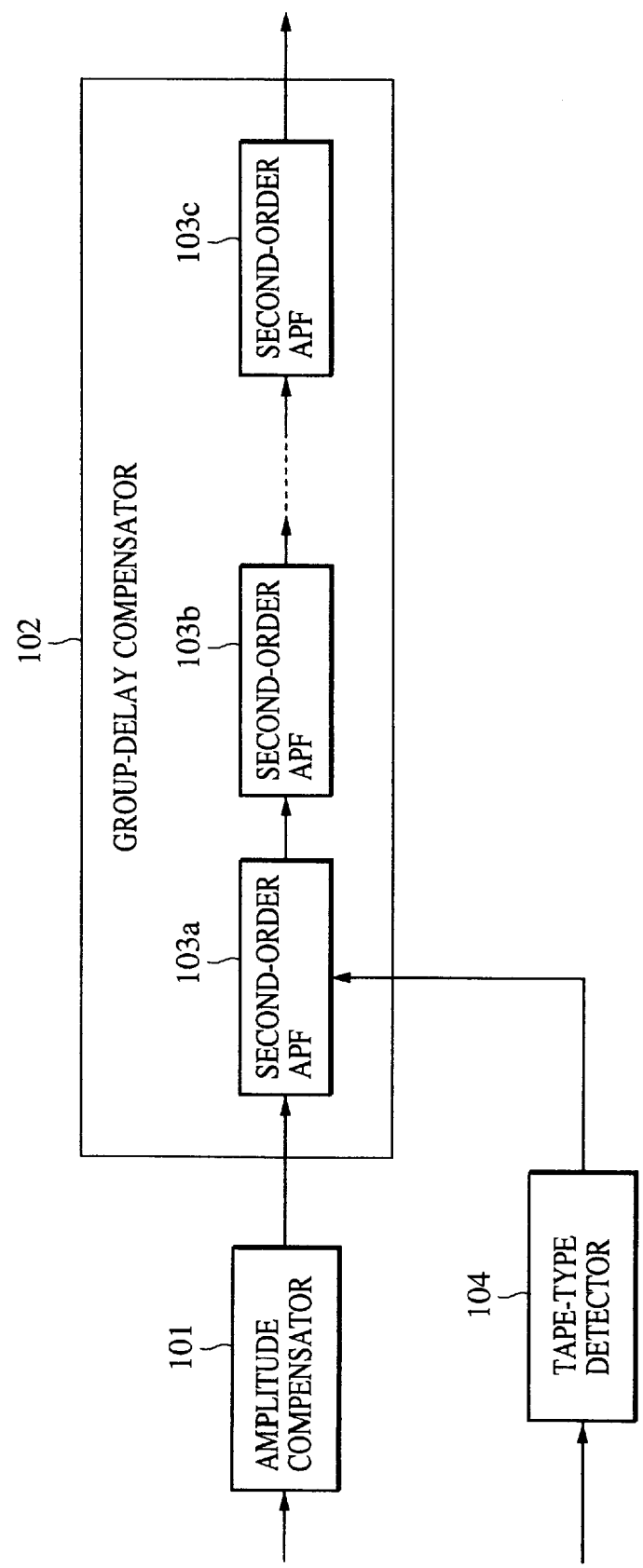
FIG. 9 is another detailed block diagram of the equalizer 8 shown in FIG. 2.
Figure 10:
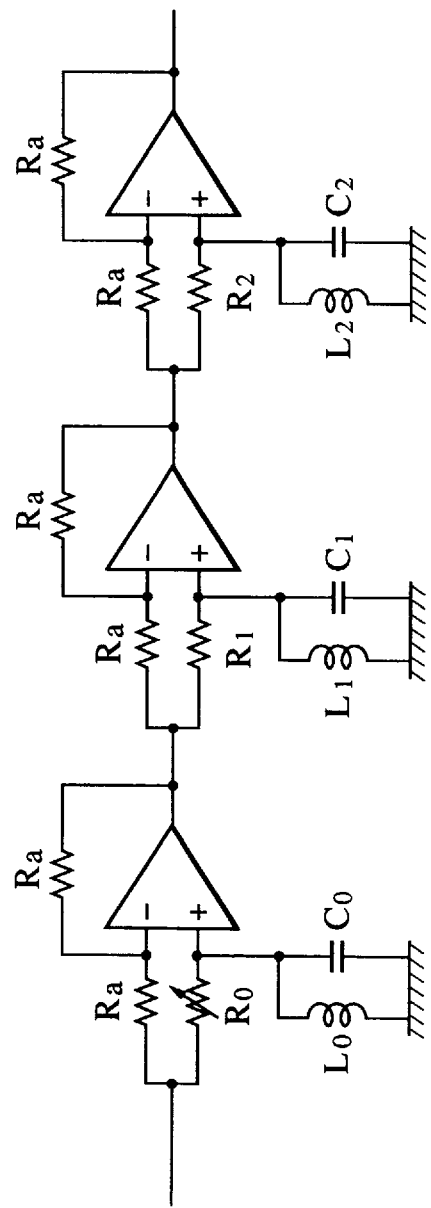
FIG. 10 is a detailed circuit configuration of the group-delay compensator 102 shown generally in FIG. 9.

In other words, as shown in FIGS. 9 and 10, the resistance of resistor $R_0$ of the all-pass filter which compensates for the group-delay characteristics in low frequencies is varied to change Q in order to alter the group-delay characteristics in low frequencies.

With this configuration, only one variable component is used, facilitating the adjustment compared with the configuration shown in FIGS. 3 and 6.

Figure 11:
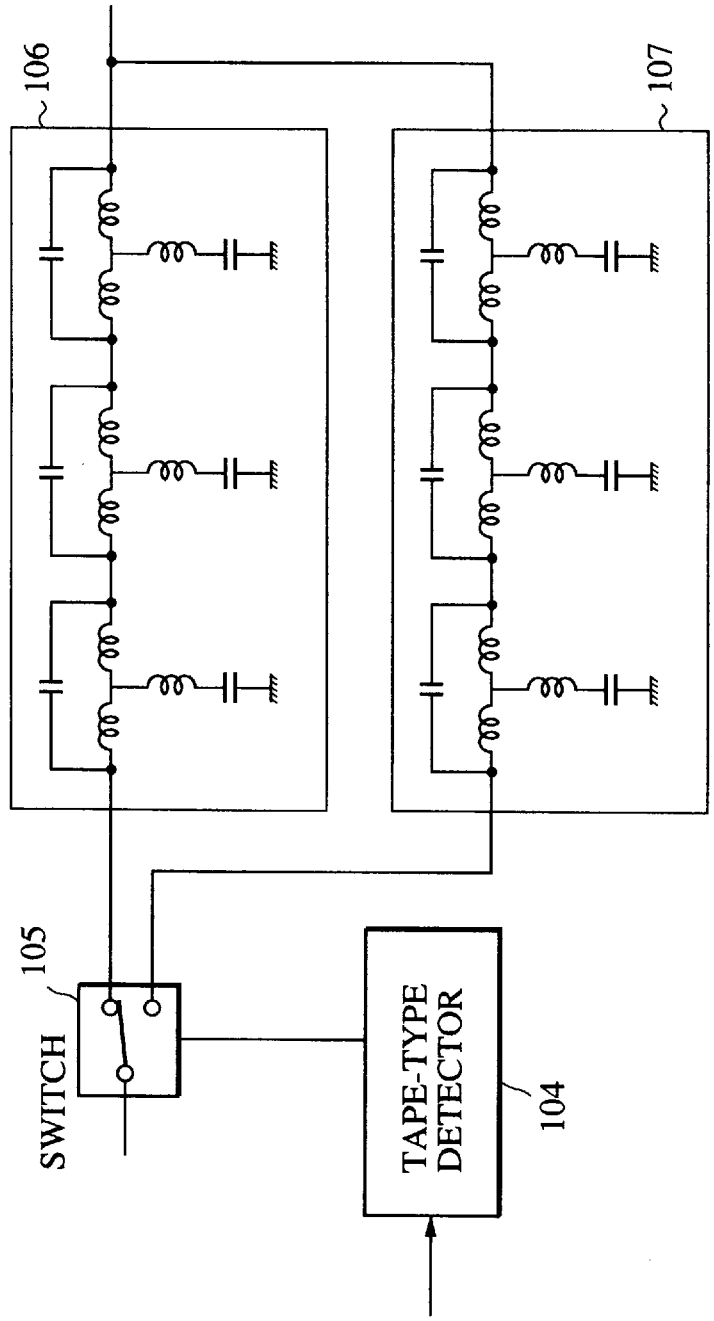
FIG. 11 is still another detailed circuit configuration of the equalizer 8 shown generally in FIG. 2.

The equalizer 8 may be configured such that, as shown in FIG. 11, ME tape group-delay compensator 106 and MP tape group delay compensator 107, each uses three, fixed, all-pass filters having equalization characteristics suited to the ME tape and the MP tape, respectively, are provided and equalization processing is performed by switching a switch 105 according to the detection result of the tape-type detector 104.

In this case, since there is no need to change the values of fa and Q of each compensation circuit, equalization processing best suited to each type of tape can be achieved with a simple configuration having capacitors C and inductors L.

In the above-described embodiment, the present invention is applied to a digital VCR using ME tape and MP tape. The present invention can also be applied to other systems in which signals having different reproduction waveforms appear, especially reproduction and equalization are performed for recording media having different group-delay characteristics, and the same advantages can be obtained.

In the above-described embodiment, the amplitude compensator 101 is followed by the group-delay compensator 102. These compensators may be configured in the reverse order.

In the above-described embodiment, the digital signal is detected from the equalized signal using Viterbi decoding. Other methods, such as the integral detection method, which has been conventionally used, may also be applied.

By controlling the group-delay characteristics according to the type of recording media, signals having different reproduction waveforms, especially the differences in the group-delay characteristics of the signals reproduced from recording media having different group-delay characteristics, can be compensated for, and the most appropriate equalization processing can be applied to the signals reproduced from different recording media.

Since the group-delay characteristics of the second-order all-pass filters are switched according to the type of tape, the difference in the waveform of the signal reproduced from each tape can be compensated for with a simple circuit configuration, and the most appropriate equalization processing can be applied to the signals reproduced from each type of tape. Therefore, data can be detected correctly from the reproduction signal.

Another embodiment of the present invention is described below.

Figure 12:
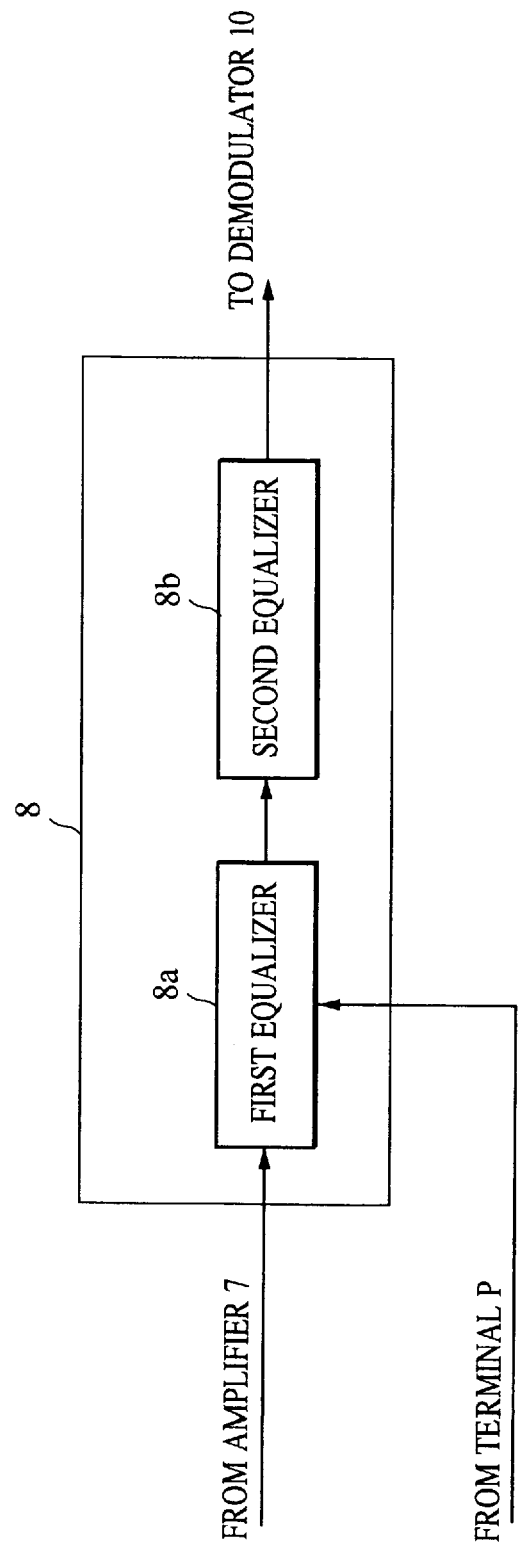
FIG. 12 is yet a further detailed circuit configuration of the equalizer 8 shown generally in FIG. 2.

FIG. 12 is a block diagram showing a configuration of an equalizer 8 according to another embodiment of the present invention. A first equalizer 8a compensates for the difference in the reproduction waveform between an ME tape and an MP tape and a second equalizer 8b compensates for deterioration of the signal reproduced from the MP tape in the magnetic recording and reproducing system. The equalizer 8, shown in FIG. 12, is described below.

Figure 13:
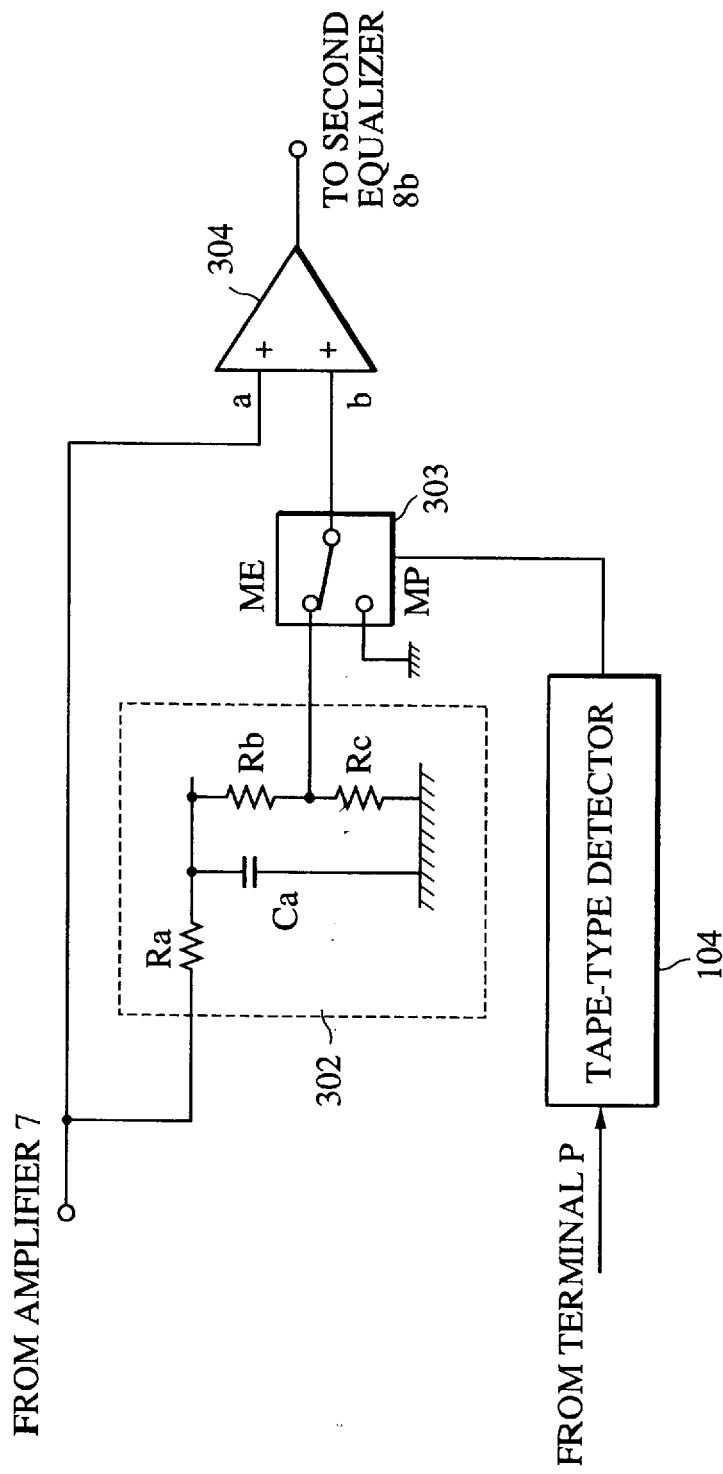
FIG. 13 is a detailed circuit configuration of the first equalizer 8a shown generally in FIG. 12.

FIG. 13 is a detailed circuit configuration of the first equalizer 8a, which includes a tape-type detector 104, an integral RC unit 302, a switch 303 and an adder 304, and for a predetermined type of tape, adds a reproduction signal to the signal obtained by integrating the reproduction signal.

Assuming that the relative speed between the head and the tape is 10.2 m/s and the record wavelength is 0.49 μm, the waveform responses of the ME tape and the MP tape shown in FIGS. 1A and 1B, respectively, are obtained.

In this embodiment, signals having the different reproduction waveform shown in the figures are input to the first equalizer 8a.

The tape-type detector 104 detects the resistance of terminal P provided for cassette C to detect the type of the tape, and switches the switch 303 according to the detection result.

In other words, when the signal reproduced from the MP tape is supplied, the switch 303 is switched to the MP side, supplying no signal to terminal b of the adder 304. Therefore, the signal reproduced from the MP tape is output as is.

When the signal reproduced from the ME tape is supplied, the switcri 303 is switched to the ME side, and the signal obtained by integrating the reproduction signal by resistor Ra and capacitor Ca and by dividing the resultant signal by resistors Rb and Rc is supplied to terminal b of the adder 304.

Figure 14:
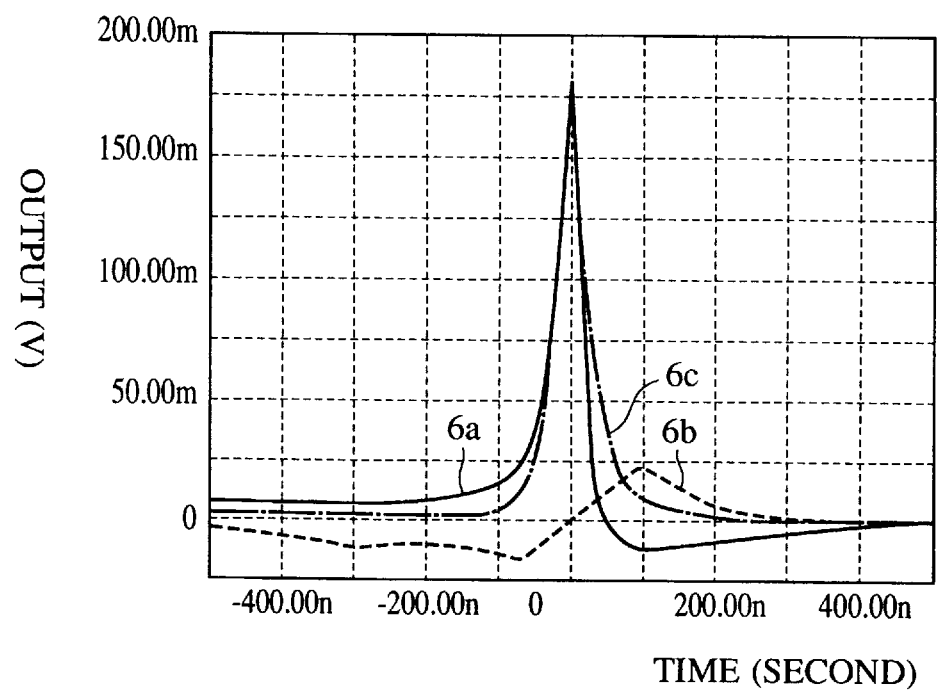
FIG. 14 is a graph showing the equalization characteristics of the equalizer 8 shown generally in FIG. 12.

A signal having waveform 6a shown in FIG. 14 is input to terminal a of the adder 304 and a signal having waveform 6b is input to terminal b. Then, a signal having waveform 6c is obtained at the output of the adder 304.

As a result, a symmetrical waveform having no undershoot can be obtained as the signal output from the first equalizer 8a, even when the ME tape is used, in the same way as when the MP tape is used. Therefore, the most appropriate reproduction waveform is obtained with the use of the second equalizer 8b having equalization characteristics compatible with the reproduction of the MP tape.

Figure 15:
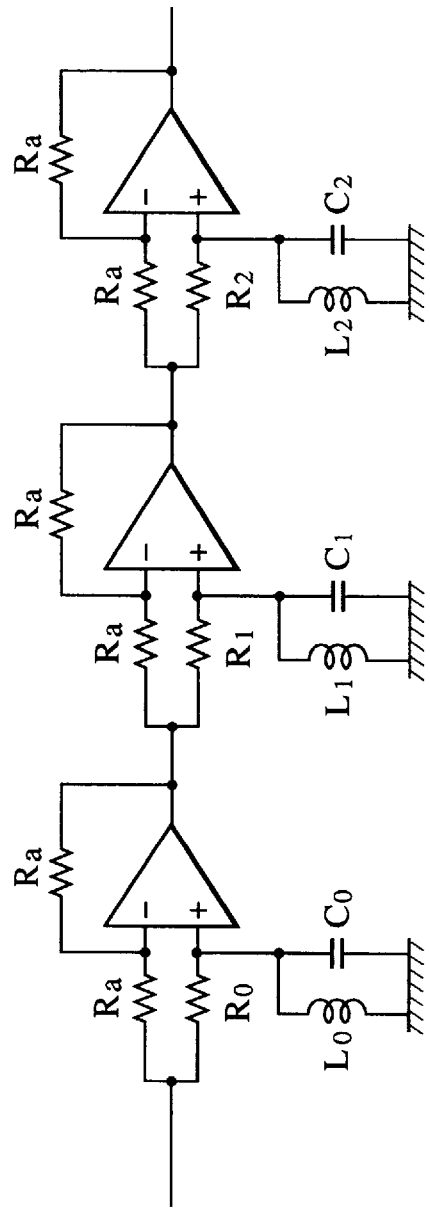
FIG. 15 is a detailed circuit configuration of the second equalizer 8b shown generally in FIG. 12.

The second equalizer 8b comprises an amplitude compensator and a group-delay compensator. The amplitude compensator is the same as that shown in FIG. 5. FIG. 15 is a detailed circuit configuration of the group-delay compensator 102. This circuit is the same as that shown in FIG. 6 except that resistors RO to $R_2$ are fixed resistors.

As described above, since the reproduction signal is integrated, and then added to the reproduction signal for the ME tape in this embodiment, the difference in the reproduction waveform of the ME tape and the MP tape can be compensated for, allowing the equalizer having single equalization characteristics to perform successful equalization processing.

In the above-described embodiment, the present invention is applied to a digital VCR using the ME tape and MP tape. The present invention can also be applied to other systems in which signals having different reproduction waveforms appear, especially when reproduction and equalization are performed for recording media having undershoots or overshoots at the rising and falling edges of the reproduction waveform, and the same advantages can be obtained.

An equalizer for compensating for differences in the characteristics of recording media and an equalizer circuit for compensating for deterioration in the signals reproduced from certain recording media are provided, thus enabling the equalization characteristics best suited to a plurality of recording media to be implemented with a simple circuit configuration.

In the above-described embodiment, the first equalizer for compensating for differences in the waveform of recording media is followed by the second equalizer for compensating for waveform changes in the reproduction signal in the magnetic recording system. These equalizers may be placed in the reverse order.

Since the reproduction signal is integrated and added to the reproduction signal for a certain type of recording media in this embodiment, the difference in reproduction waveforms can be compensated for, especially the differences in the reproduction signals from recording media having undershoots or overshoots at the rising and falling edges of the reproduction waveform can be compensated for, allowing the equalizer circuit having only a single equalization characteristics to perform the equalization processing which is the most appropriate for each reproduction signal.

What is claimed is:

1. A reproducing apparatus, comprising:
   reproducing means for reproducing digital data from a plurality of types of magnetic recording media;
   equalizing means for equalizing the digital data reproduced by said reproducing means, said equalizing means including a plurality of all-pass filters for adjusting a group-delay of the reproduced digital data; and
   controlling means for controlling group-delay characteristics of at least one of said plurality of all-pass filters of said equalizing means according to the types of the magnetic recording media.

2. An apparatus according to claim 1, wherein said plurality of all-pass filters are second-order, active filters.

3. An apparatus according to claim 1, wherein said controlling means controls the group-delay characteristics of each of said plurality of all-pass filters.

4. An apparatus according to claim 1, wherein said controlling means controls only the group-delay characteristics of an all-pass filter which adjusts the group-delay of low frequency components of the reproduced digital data among said plurality of all-pass filters.

5. An apparatus according to claim 1, wherein said controlling means controls at least one quality factor of at least a part of said plurality of all-pass filters.

6. An apparatus according to claim 1, wherein said recording media includes metal-particle tape and metal-evaporated tape.

7. An apparatus according to claim 6, wherein said controlling means includes detecting means for detecting a resistance of a terminal provided for a cassette to detect the tape type from one of said metal-particle tape and said metal-evaporated tape.

8. A reproducing apparatus, comprising:
   reproducing means for reproducing digital data from a plurality of types of recording media;
   integrating means for integrating the digital data reproduced by said reproducing means;
   detecting means for detecting a type of said plurality of types of recording media being reproduced by said reproducing means;
   adding means for adding the digital data to be supplied to said integrating means and the output of said integrating means; and
   control means for controlling whether the digital data to be supplied to said integrating means and the output of said integrating means are added by said adding means according to the detection result of said detecting means.

9. An apparatus according to claim 8, further comprising equalizing means for equalizing the data output from said adding means.

10. An apparatus according to claim 9, wherein said equalizing means has single equalization characteristics for compensating for loss of data reproduced from a predetermined one of said plurality of types of recording media.

11. An apparatus according to claim 8, wherein said recording media includes metal-particle tape and metal-evaporated tape.

12. An apparatus according to claim 11, wherein said detecting means detects a resistance of a terminal provided for a cassette having one of said metal-particle tape and said metal-evaporated tape to detect the tape type.

13. A reproducing apparatus, comprising:
   a transducer for reading data stored in a magnetic recording medium as an electric signal;
   an equalizer having a plurality of all-pass filters for adjusting a group-delay of the data read by said transducer; and
   a controller for controlling group-delay characteristics of said plurality of all-pass filters.

14. An apparatus according to claim 13, further comprising a detector for detecting the data from the signal equalized by said equalizer.

15. A signal processing apparatus, comprising:
   input means for inputting digital data reproduced from a plurality of types of magnetic recording media;
   equalizing means for equalizing the digital data input by said input means, said equalizing means including an amplitude adjusting part for adjusting an amplitude, and a group-delay adjusting part having a plurality of all-pass filters for adjusting a group-delay; and control means for controlling group-delay characteristics of at least one of said plurality of all-pass filters of said group-delay adjusting part according to the types of the magnetic recording media.

16. An apparatus according to claim 15, wherein each of said plurality of all-pass filters adjusts the group-delay of different frequency components of the input digital data.

17. An apparatus according to claim 16, wherein sid control means controls only the group-delay characteristic of an all-pass filter which adjusts the group-delay of low frequency components of the input digital data among said plurality of all-pass filters.

18. An apparatus according to claim 15, wherein said plurality of all-pass filters are second-order, active filters.

19. An apparatus according to claim 15, wherein said controlling means controls the group-delay characteristics of each of said plurality of all-pass filters.

20. An apparatus according to claim 15, wherein said controlling means controls at least one quality factor of at least a part of said plurality of all-pass filters.

21. An apparatus according to claim 15, wherein said recording media includes metal-particle tape and metal-evaporated tape.

22. An apparatus according to claim 21, wherein said controlling means includes detecting means for detecting a resistance of a terminal provided for a cassette to detect a tape type from one of said metal-particle tape and said metal-evaporated tape.

* * * * *

UNITED STATES PATENT AND TRADEMARK OFFICE
CERTIFICATE OF CORRECTION

PATENT NO. : 5,864,442

DATED : January 26, 1999

INVENTOR(S) : TATSUYA NAITO

It is certified that error appears in the above-identified patent and that said Letters Patent is hereby corrected as shown below:

COLUMN 2
  line 9, "anther" should read --another--.

COLUMN 4
  line 1, "a" should read --an--;
  line 2, "$R_1$," should read --$R_{101}$,--;
  line 5, "$L_{101}$ and" should read --$L_{101}$, and--; and
  line 39, "QO," should read --$Q_o$,--.

COLUMN 6
  line 61, "switcri" should read --switch--.

UNITED STATES PATENT AND TRADEMARK OFFICE
CERTIFICATE OF CORRECTION

PATENT NO. : 5,864,442

DATED : January 26, 1999

INVENTOR(S) : TATSUYA NAITO

It is certified that error appears in the above-identified patent and that said Letters Patent is hereby corrected as shown below:

COLUMN 7
   line 14, "RO" should read --$R_o$--; and
   line 51, "characteristics" should read
     --characteristic--.

COLUMN 9
   line 11, "sid" should read --said--.

Signed and Sealed this

Sixteenth Day of November, 1999

Q. TODD DICKINSON

*Attest:*

*Attesting Officer*     *Acting Commissioner of Patents and Trademarks*